June 9, 1964          L. A. HERZIG          3,136,678

FILM SPLICER

Filed Sept. 27, 1960          6 Sheets-Sheet 1

INVENTOR.
LEONARD A. HERZIG
BY D. Malcolm
ATTORNEY

June 9, 1964  L. A. HERZIG  3,136,678
FILM SPLICER

Filed Sept. 27, 1960  6 Sheets-Sheet 2

INVENTOR.
LEONARD A. HERZIG
BY D. Malcolm
ATTORNEY

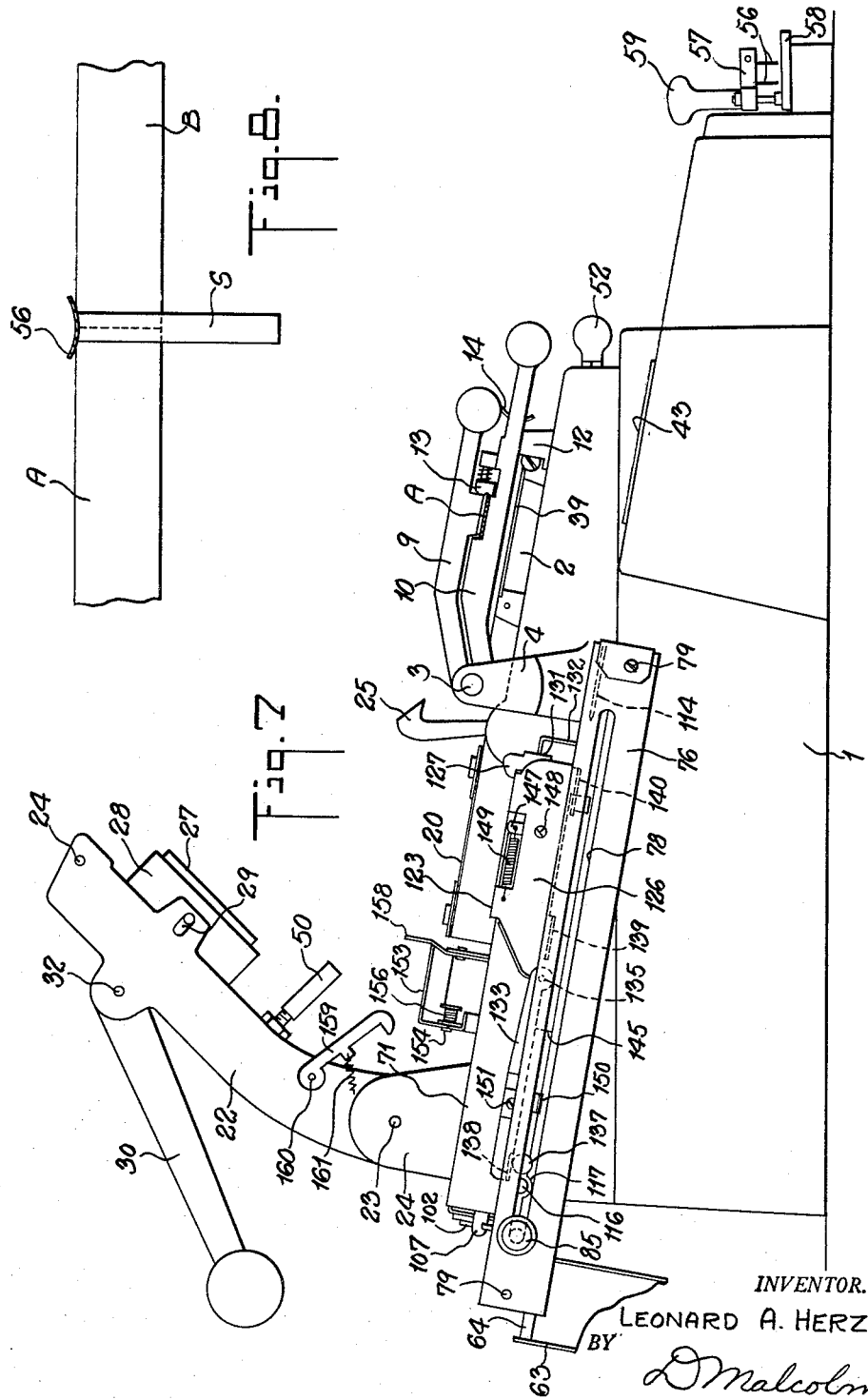

June 9, 1964 L. A. HERZIG 3,136,678
FILM SPLICER
Filed Sept. 27, 1960 6 Sheets-Sheet 5
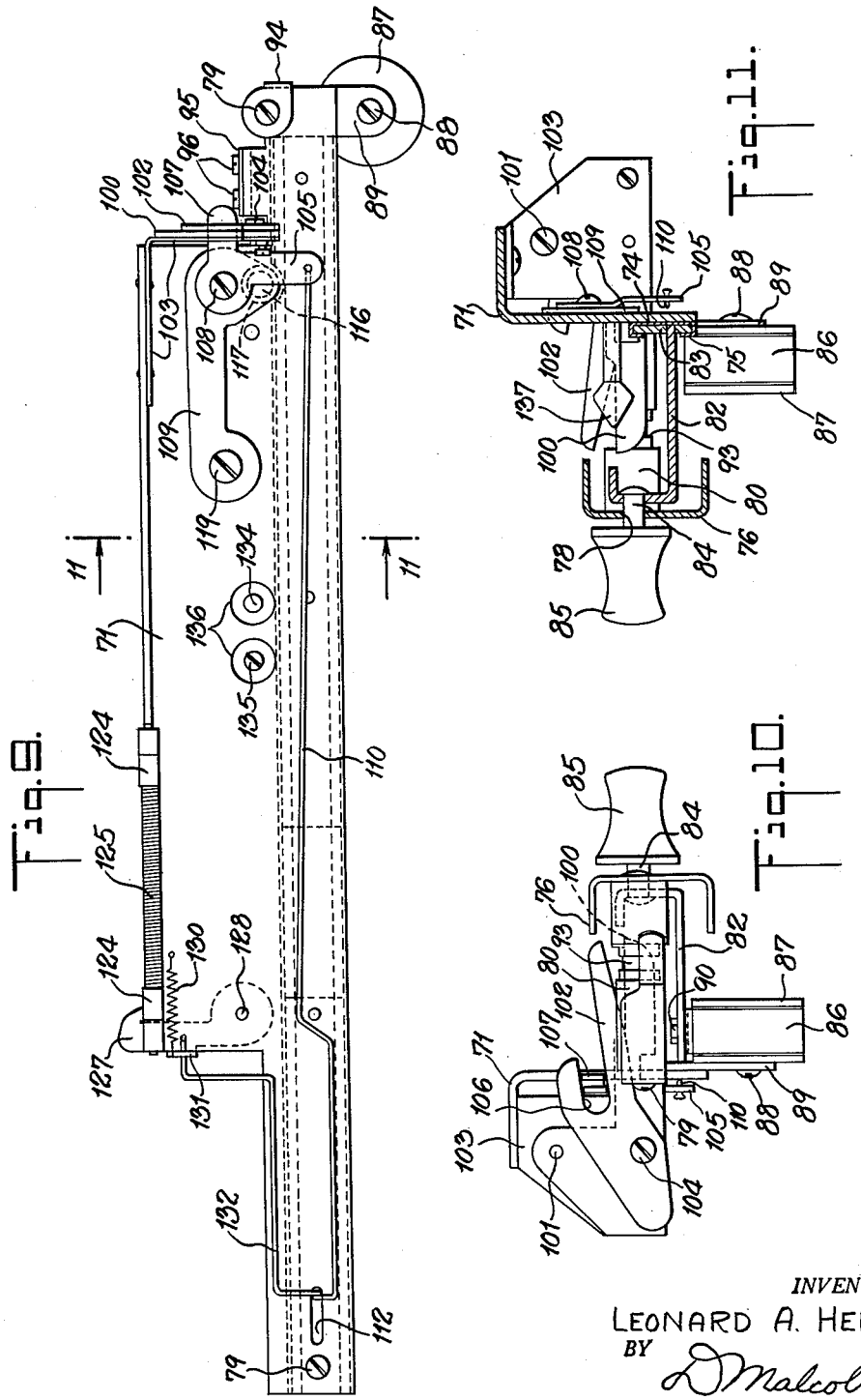
INVENTOR.
LEONARD A. HERZIG
BY
D Malcolm
ATTORNEY

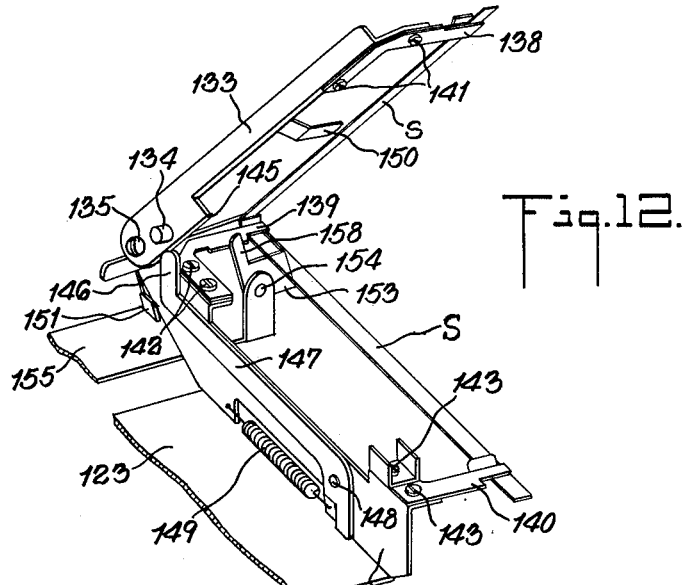
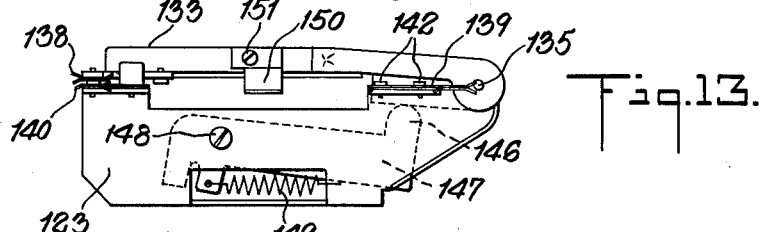
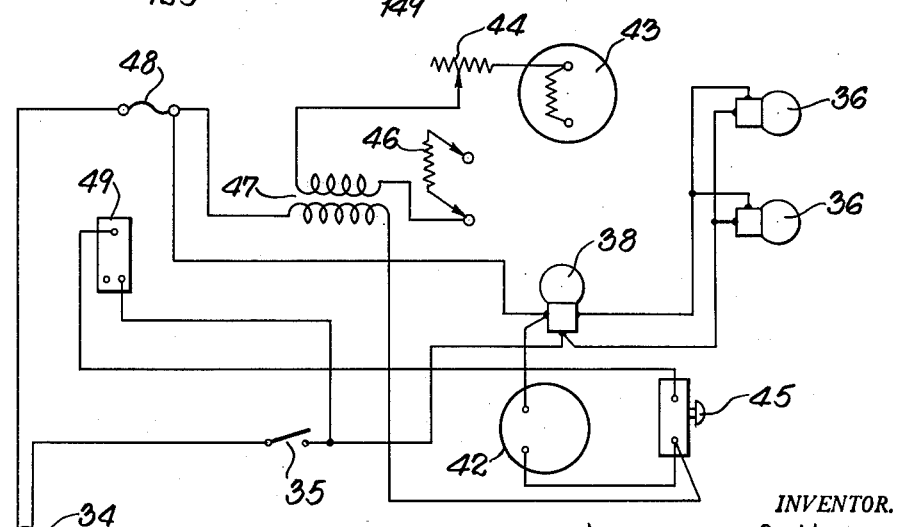

United States Patent Office 3,136,678
Patented June 9, 1964

3,136,678
FILM SPLICER
Leonard A. Herzig, Malba, N.Y., assignor to Prestoseal Manufacturing Corp., Long Island City, N.Y., a corporation of New York
Filed Sept. 27, 1960, Ser. No. 58,830
9 Claims. (Cl. 156—502)

This invention relates to splicing films, tapes, sheets and the like, and it has for its object to provide a novel and improved method and apparatus for uniting such objects through the application of heat and pressure.

Another object of the invention is to provide a novel and improved method and apparatus for automatically applying a bonding strip or sliver to one or both sides of abutting films, tapes or other objects and for utilizing said strip or sliver to fuse said objects with a splice which is as strong or stronger than the object itself.

A further object is to provide a precision apparatus of the type specified for quickly and accurately positioning the bonding strip or sliver upon the abutting edge portions of the films or other objects to be joined, so that the bonding heat and pressure may be applied instantly and accurately to effect a perfect splice.

Still another object is to provide a splicing apparatus of the above type in which the bonding strip is in the form of a continuous narrow band or ribbon wound on a reel, in which said ribbon is automatically fed forward, severed to provide a sliver of desired length, then folded in the general shape of a clothespin and positioned so that the abutting ends of the films, tapes or other objects to be joined are sandwiched between the two halves of the sliver, whereupon the splice is effected by the simultaneous application of heat and pressure, after which the surplus portions of the sliver may be severed and discarded.

Another object is to provide a splicing apparatus of the foregoing type having novel and improved details of construction and features of operation.

Various other objects and advantages will be apparent as the nature of the invention is more fully disclosed.

The invention will be described in its application to the joining of strips of microfilm, motion picture film and the like, although it will be evident as the description progresses that the method and apparatus disclosed and claimed herein are equally applicable to the splicing of paper tapes as well as to other types and shapes of film-like materials.

A successful method and apparatus for splicing thermoplastic films are disclosed in L. A. Herzig and M. Coan Patent No. 2,468,629, issued April 26, 1949, according to which two strips of film to be joined are arranged in end-to-end contact on a heater block, and then, upon the simultaneous application of heat and pressure, the abutting edges of said strips of film (and a narrow thermoplastic sliver which may be placed so as to span said abutting edges) are softened and the two lengths of film are bonded together. The same method and apparatus are used for fusing paper and magnetic tapes as well as other non-plastic materials.

The above-mentioned narrow sliver may be used, as a matter of preference, for splicing even those films which are quite capable of being thermoplastically butt-joined without the use of such a sliver, for instance two pieces of cellulose acetate film, or two pieces of cellulose tri-acetate film, or two pieces of polyester base film. There are also situations in which the composition of the films or other materials is such that the use of a bonding sliver is highly desirable and sometimes essential to give the joint the required strength and flexibility. This includes cases in which the objects to be spliced are of different compositions.

The apparatus of the present invention comprises, in combination with a heater block and a pressure block which cooperate to effect the splice, means for drawing a band or ribbon (for example a thermoplastic band or ribbon) from a dispenser such as a reel and threading it linearly through spring clamps on a foldable hinged carriage, means for automatically severing said ribbon while held by said clamps to provide a sliver of desired length supported linearly on said carriage, means for automatically swinging the hinged carriage containing said sliver to a position in which half of the carriage seats its half of the sliver on the heater block while the other half of the carriage and sliver fold into an upright or semi-upright position, means including film clamps for positioning the films to be spliced in end-to-end contact upon that portion of the sliver which rests on the heater block, means for folding the upright half of the hinged carriage down until its half of the sliver spans the contacting edges of the films to be spliced overlying the heater block, and means including a pressure arm containing a pressure block for applying heat and pressure to unite the end portions of the films with the folded sliver between the two halves of which said films are sandwiched.

Upon completion of the splice, the pressure arm containing the pressure block is raised, permitting the spliced film to be removed from their film clamps. The foldable hinged carriage is manually returned to its initial position in which its two hinged halves are straight so that their various sliver clamps extend in linear file ready to receive another length of thermoplastic ribbon from the reel for the next splicing operation. The spliced film removed from the machine, of course, contains excess portions of the sliver projecting outwardly from both edges of the film at the splice. These excess portions of the sliver are trimmed off, as hereinafter described, and discarded as waste.

The invention is described in connection with a preferred embodiment illustrated in the accompanying drawings, in which:

FIG. 7 is a side elevational view of the apparatus, looking into the left-hand side of FIG. 6;

FIG. 8 is a plan view showing the spliced strips of film after an arcuate knife blade has severed the looped end of the bonding sliver shown in FIG. 5, but before the tail ends of said sliver have been severed;

FIG. 9 is a longitudinal sectional view of the sliver dispensing mechanism and associated parts, taken on line 9—9 of FIG. 6;

FIG. 10 is an end view, looking into the right-hand end of FIG. 9;

FIG. 11 is a transverse sectional view taken on line 11—11 of FIG. 9;

FIG. 12 is a broken perspective view, showing the hinged sliver carriage in elevated position;

FIG. 13 is a detail view showing the position which parts of the sliver carriage occupy during the splicing operation; and FIG. 14 is a diagram of the electrical circuit.

In the following description certain specific terms are used for convenience in referring to the various details of the invention. These terms, however, are to be interpreted as broadly as the state of the art will permit.

Purpose of the Invention

The purpose of the apparatus hereinafter described is to take two strips of thermoplastic film, such as the strips A and B of FIG. 1, and bond them together by the automatic application of heat and pressure, in a splice which is as strong or stronger than the film itself.

The films may be of any type, such as standard motion picture film having sprocket holes on both longitudinal edges thereof, or film employed solely for sound reproduction which may have sprocket holes on only one longitudinal edge, or microfilm which has no sprocket holes. The films may also be of any composition.

Figure 1:
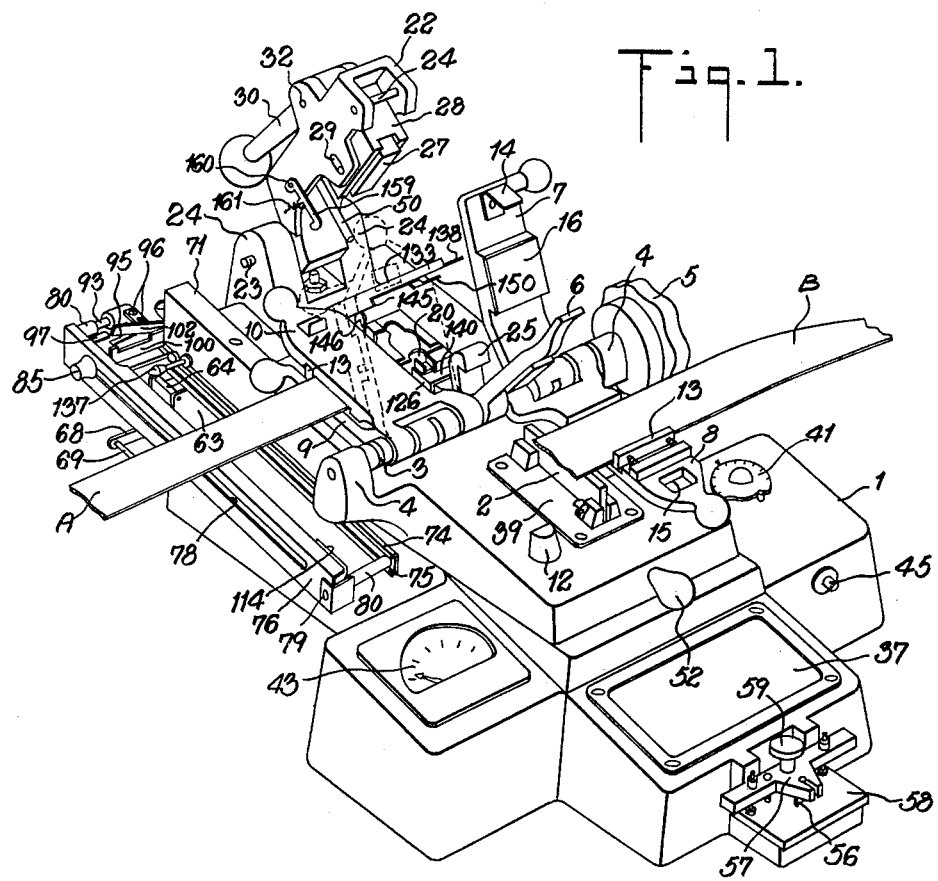
FIG. 1 is a perspective view of a film splicing apparatus embodying the invention, in which the film at the left has already been trimmed, and the film at the right is about to be trimmed, preparatory to splicing.

To simplify the description, let it be assumed that the strips of film A and B shown in FIG. 1 are lengths of conventional cellulose acetate microfilm which it is desired to splice together end-to-end.

These strips of film A and B may happen to have ragged or uneven ends (see the left-hand end of the film B in FIG. 1). Before the splice is effected these ends (whether ragged or not) are trimmed or sliced off, in a manner hereinafter described, so that the ends to be bonded together are exactly even and are perpendicular to the sides of the films.

Figure 3:
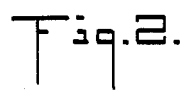
FIG. 3 is a perspective view of the abutting strips of film bonded together, after the bonding sliver has been trimmed off, this being the finished product of the machine.
Figure 5:
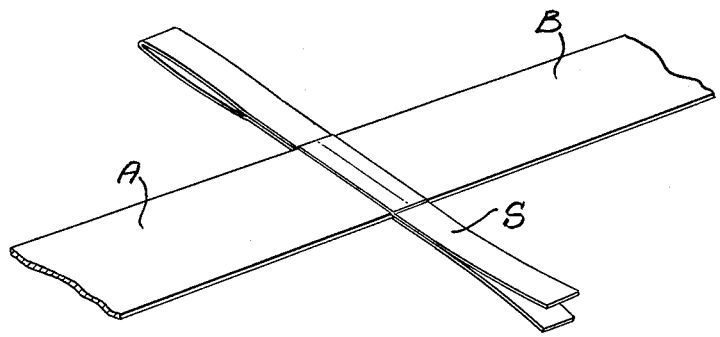
FIG. 5 is a perspective view showing the abutting strips of film bonded together, before the bonding sliver has been trimmed off to produce the finished product shown in FIG. 3.

In the apparatus of the present invention the strips of film A and B are supported in end-to-end contact; a strip of thermoplastic ribbon S (FIG. 5), which I call a looped or clothespin-shaped sliver (for example of cellulose acetate) is automatically applied so that it spans the abutting edges of films A and B on both sides of said films; heat and pressure are simultaneously applied to the sandwished area formed by the films and sliver, bonding the sandwiched portions securely and intimately together as shown in FIG. 5; and both of the excess or waste ends of the sliver S are then trimmed or sliced off, as illustrated in FIG. 8 (where the looped end of said sliver has already been sliced off by an arcuate knife blade and discarded, but where the tail ends of said sliver have not yet been severed) finally leaving the completed splice as shown in FIG. 3.

For the sake of simplicity I shall first described the general construction of the machine, including the mechanisms which trim the ends of the films to be joined, and the mechanisms which effect the thermoplastic splice; and thereafter, under separate headings, I shall describe the novel mechanisms which feed and accurately position the bonding sliver or ribbon in the machine, followed by a description of the complete cycle of operations.

Film Trimming and Splicing Mechanisms

The apparatus shown in the drawings comprises a base 1 upon and in which all of the parts are mounted. An elongated stationary cutter blade 2 is mounted centrally on the forward top part of the base 1, as shown in FIG. 1.

Figure 4:
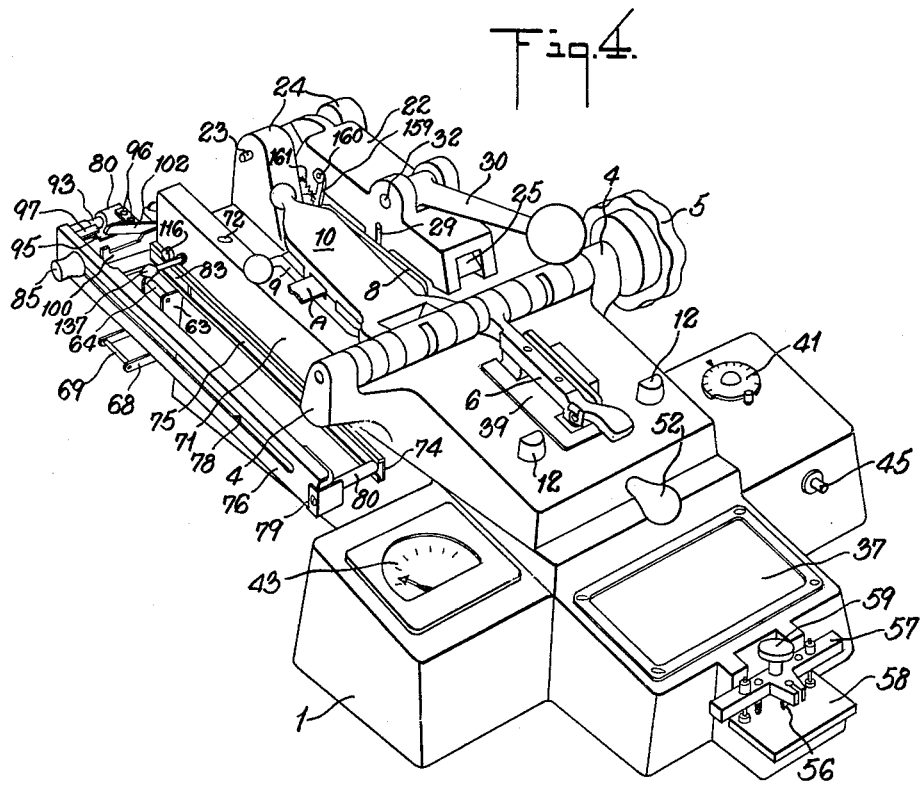
FIG. 4 is a perspective view of the apparatus showing the parts in the splicing or "welding" position, but with the sliver handling mechanisms omitted to clarify the illustration and description of other parts of the machine.
Figure 6:
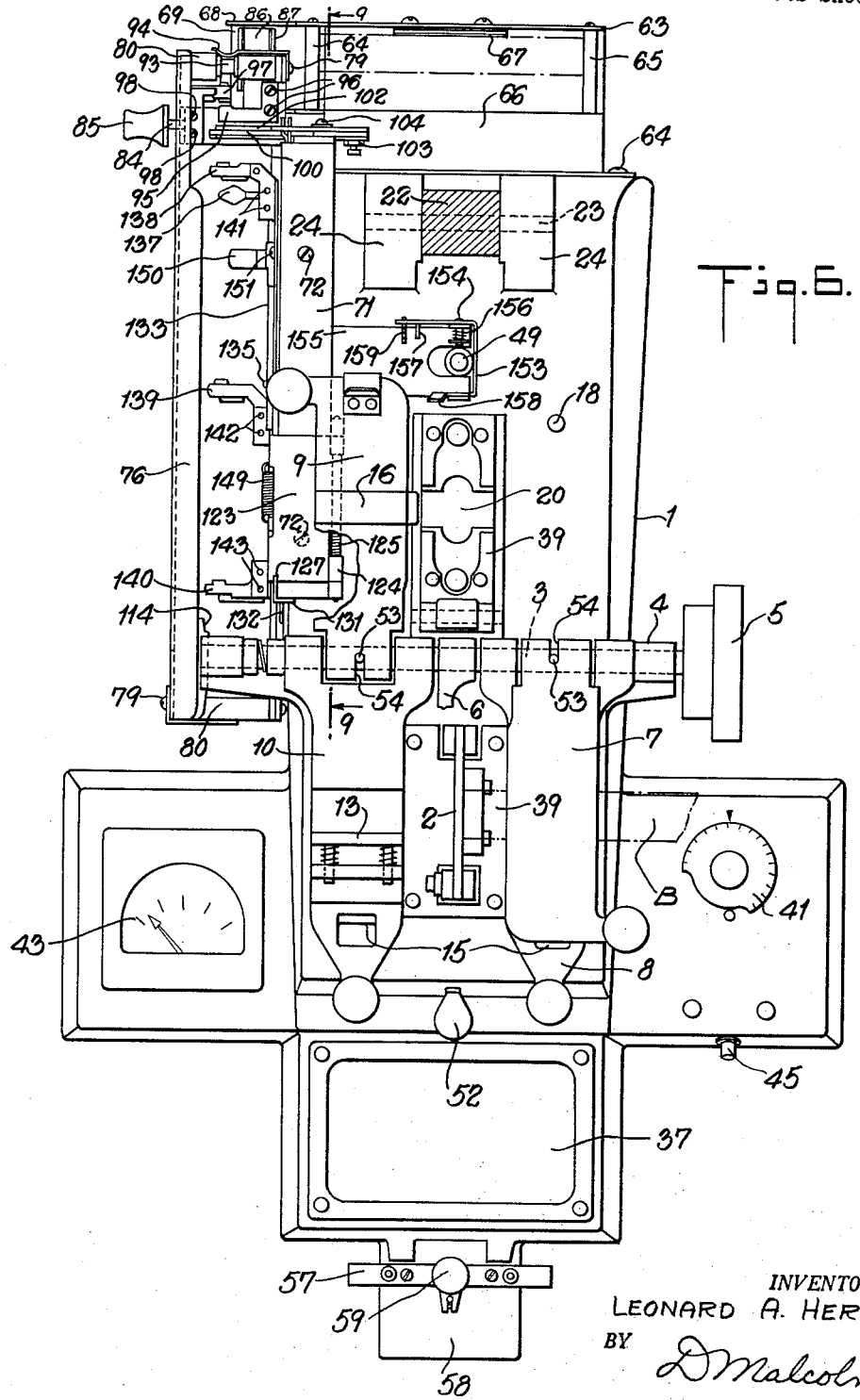
FIG. 6 is a top plan view of the apparatus with the pivoted pressure arm broken off to avoid obscuring other parts of the machine.

Rotatably mounted on a transverse shaft 3, which in turn is rotatably mounted in lugs 4 and actuated by hand wheel 5, is a cutter arm 6 cooperating with the stationary cutter blade 2, as shown in FIGS. 1, 4 and 6.

Also rotatably mounted on transverse shaft 3 are two pairs of film clamps 7—8 and 9—10, the mating clamps 7—8 being to the right of cutter arm 6, and the mating clamps 9—10 being to the left of cutter arm 6 in FIGS. 1, 4 and 6.

The two pairs of film clamps 7—8 and 9—10 are alike, hence the corresponding parts thereof (FIGS. 1, 4 and 6) whereby the films are held in these clamps, are given the same reference numerals. When either clamp member 8 or 10 is in the forward "down" position (as is the clamp member 8 in FIG. 1) it strikes against a stop member 12. With clamp member 8 in this limiting forward position as shown in FIG. 1, the film B is manually seated in said member 8 (glossy side up) where it is automatically accommodated and yieldingly held by the spring-actuated pusher bar 13. When the film B is thus seated in said member 8 with the ragged edge of said film properly positioned with respect to stationary cutter blade 2, the cooperating clamp member 7 is closed down to the position shown in FIG. 6, where the spring catch 14 on said member 7 engages in a slot 15 of member 8, securing the two halves of clamp 7—8 together with block 16 on the underside of member 7 holding film B sandwiched in place under pressure.

The operator now grasps the cutter arm 6 and moves it downwardly in FIG. 1 with a chopping action, slicing off the uneven left-hand end of film B. FIG. 4 shows the cutter arm in this "down" position. The operator now raises the cutter arm 6. Next, the operator grasps the ball-knob handle on the end of lower clamp member 8 (FIG. 6) and swings the locked film clamp 7—8 (with the trimmed film B locked therein) backwardly until the upper clamp member 7 hits the stop 18 (FIG. 6) on the top of base 1. The operator then clamps the end of the other film, A, in the left set of film clamps 9—10 and repeats the locating, clamping and film-cutting steps described above. However, the operator does not now raise the cutter arm 6, but leaves it in the "down" position shown in FIG. 4. And so now, at the conclusion of both film-trimming operations, both sets of film clamps 7—8 and 9—10 will be in the "back" position resting on their respective back stops 18, and the films A and B, secured in their respective film clamps, with the trimmed edges of said films aligned and abutting on the heater block 20 (which is shown in FIGS. 1, 6 and 7) with the emulsion side of both films facing up.

At this stage of the description (not yet having described the mechanisms for feeding, severing and positioning the sliver ribbon S) it will simply be assumed that the abutting aligned edges of the films A and B are sandwiched between the two flat faces of a looped or clothespin-shaped thermoplastic ribbon or sliver S, as in FIG. 5, and that the parts as pictured in FIG. 5 are arranged in the machine with the sliver S and the abutting edges of films A and B seated longitudinally of the heater block 20 ready to be bonded together.

A pressure arm 22 is pivoted at 23 in lugs 24 at the rear of base 1, as shown in FIGS. 1, 4, 6 and 7. A spring, not shown, normally holds this pressure arm in the elevated position shown in FIGS. 1 and 7. When pressure arm 22 is moved downwardly upon its pivot 23 to the lower limiting position shown in FIG. 4, a forward horizontal pin 24 on said arm (FIG. 1) engages a spring-actuated latch 25 on base 1, holding said arm in said lowered position.

The pressure arm 22 carries a pressure block 27 mounted in a frame 28 which has a limited resilient up and down movement in arm 22 as indicated by the slot-and-pin connection 29 in FIGS. 1 and 7. A pressure lever 30 is pivoted at 32 on the arm 22; and the inner end of said lever 30 adjacent its pivot 32 is cam-shaped and bears against the top face of the frame 28 which carries pressure block 27. Consequently, when pressure arm 22 is locked in the "down" position (FIG. 4) and pressure lever 30 is moved forward as far as it will go (FIG. 4) the pressure block 27 (which in that position is aligned with heater block 20 on base 1) will hold the film-and-sliver "sandwich" of FIG. 5 upon heater block 20 with considerable pressure during the ensuing heat-sealing operation.

The composition of the heater block 20 and the pressure block 27 form no part of the present invention. They may be made of any suitable materials. For example, as in Herzig et al. Patent No. 2,468,629, one or both of the contact surfaces of blocks 20 and 27 may be mica. With such surfaces the heat distribution is gradual and tapering, being at a maximum directly over the heating element (hereinafter described) beneath heater block 20, which area encompasses the line of juncture of the strips of film being spliced. Outwardly of this narrow line the temperature diminishes gradually so that there are no sharp differences of temperature from point to point along the film surfaces. As a result, the bonding sliver S is molded and blended into the end portions of the films A and B with a bond which is pliable and is usually stronger than the films themselves.

With the parts in the above-mentioned position (FIG. 4) ready to effect the splice; with the electric plug 34 (FIG. 14) connected to a source of 115 volt A.C.; and the main switch 35 (shown only in FIG. 14) closed, lighting the lamps 36 beneath a translucent viewing panel 37 in the front of base 1 and the lamp 38 beneath a translucent window 39 under cutter blade 2; the operator adjusts the timer dial 41 (setting synchronous timer motor 42 in FIG. 14) to the time setting required by the particular type of films to be spliced. Once set correctly, the timer adjustment may be retained permanently unless a different type of film to be spliced requires a change. The ammeter 43 is set by adjusting the rheostat 44 (FIG. 14). The operator then presses the start switch 45, energizing the heater element 46 (FIG. 14) which is mounted beneath heater block 20 and is connected to the secondary winding of transformer 47. The primary winding of transformer 47 is connected to the source of current through fuse 48 and a normally open safety switch 49. This safety switch 49 is closed by a safety interlock pin 50 carried by pressure arm 22 (FIGS. 1 and 7) hence the operating circuit can be energized only when pressure arm 22 is in the "down" position with the pressure on. At the conclusion of the heating cycle, usually 1.5 to 3 seconds, the synchronous timer 42 opens the start switch 45. A cooling period of five to eight seconds is now allowed before releasing the pressure lever 30 from the down position shown in FIG. 4.

After the cooling period, the operator turns the pressure lever 30 back, thus relieving pressure on the splice. Next, the pressure arm release knob 52 on the front of base 1 is pulled out, retracting the latch 25 (FIG. 7) and allowing the spring-actuated pressure arm 22 to swing up to the position shown in FIGS. 1 and 7. The operator (at the front of the machine) then grasps the hand wheel 5 and rotates it in a direction toward himself as viewed in FIG. 6. The shaft 3 has two pins 53 engaged in slots 54 in the bearing portions of film clamps 7—8 and 9—10 (FIG. 6) and, upon rotation of shaft 3 by hand wheel 5 as just described, the pins 53 simultaneously engage the ends of slots 54 of the film clamps and bring said film clamps forward in unison until they are seated on the clamp stops 12 previously described.

The top film clamp members 7 and 9 are next raised to the vertical position, and the spliced film (shown in FIG. 5) is removed. All that remains to be done is to trim off the excess waste ends of the sliver S in FIG. 5. This operation is performed by an arcuate knife blade 56 carried by a spring-raised depressible bar 57 mounted on platform 58 on the front of base 1 and actuated by handle 59 (FIG. 7). The film assembly shown in FIG. 5 is placed on platform 58 with the marginal edge of the film properly positioned with respect to knife blade 56 (see FIG. 8) so that, on depressing handle 59 (FIG. 7) the knife blade will descend and sever the overhanging end of the sliver S with an arcuate slice which extends a tiny bit into the margin of the spliced films and thus avoids leaving any roughness at the splice. FIG. 8 shows the film after the looped end of sliver S has been trimmed off. When the tail ends of the sliver are severed in the same manner, the end product of the machine appears as shown in FIG. 3.

The finished splice may be examined by placing the strip of FIG. 3 on the translucent viewing panel 37 (FIGS. 1, 4 and 6) which is constantly illuminated by the lamps 36 (FIG. 14).

*Sliver Feeding and Positioning Mechanisms*

The mechanisms for feeding the sliver S and positioning it in the machine, preparatory to the splicing operation, include a stationary dispenser or container 63 which is secured to the back of base 1 as by screws 64 (FIG. 6). In the embodiment illustrated, the container 63 is stamped out of a single piece of sheet metal and has integral front, back and bottom walls, and is open at the top as well as at both ends. The front and back walls are secured together at the top by rivets 65, and the front wall has an integral upwardly-extending bent flange 66 through which the screws 64 extend to secure the container to the back of base 1.

In practice, I prefer to house four rolls of sliver tape or ribbon in a magazine in the container 63, as indicated by the broken lines in FIG. 6. One of said rolls is in use while the others are simply "spares" which are stored in the container for convenience. Each roll is formed of a continuous ribbon wound in conventional manner like a very narrow roll of surgical gauze. The rolls are loose in the mazazine; and the inner back wall of container 63 carries a broad leaf spring 67 (FIG. 6) which bears lightly against the magazine, permitting the roll to unwind readily while at the same time the weight of the roll itself, within the magazine, prevents over-running. The front and back walls of the dispensing container 63 have narrow integral ears 68 adjacent the bottom thereof, extending outwardly at the left of FIG. 6, and these ears support a rotatable guide pin or roller 69 (FIGS. 1, 4 and 6) upon which the sliver ribbon tracks as it emerges from the bottom of container 63 on its way up to the positioning mechanisms.

The sliver feeding and positioning mechanisms now to be described are all supported by an elongated sheet-metal supporting plate 71 of inverted L-shape, which has a narrow flat top and is secured as by screws 72 to the base 1 at the left side thereof as viewed in FIGS. 1, 4 and 6, and the wider depending flat side of which is parallel with the left side of base 1 as shown in FIGS. 1 and 4. This depending flat side of plate 71 has integral extensions at both lower ends thereof, as shown in FIG. 9, making the side of plate 71 longer at the bottom than it is at the top.

The said elongated bottom portion of plate 71 supports a pair of stationary longitudinal tracks in which the sliver-feeding mechanism slides. One of said tracks comprises an elongated strip of sheet metal 74 which extends lengthwise of supporting plate 71 (FIG. 4) and has its forward longitudinal top and bottom edges turned inwardly to form a slot or track 75 as shown in FIGS. 4 and 11. The other track of the pair comprises an elongated strip of sheet metal 76 which is parallel to and spaced horizontally from the strip 74, and has its longitudinal top and bottom edges turned inwardly at right angles, as shown in FIGS. 1, 4, 6, 10 and 11. This elongated strip of sheet metal 76 has a longitudinal slot 78 (FIGS. 1, 4, 7 and 11) which is aligned with the track 75 in the strip 74. These two parallel elongated strips 74 and 76 are secured together, and to the lower integral end extensions of supporting plate 71, by screws or rivets 79 extending through tubular spacers 80 (FIGS. 1, 4 and 6) which maintain the spacing between the slots or tracks 75 and 78.

The construction of the slide member 82 which slides in the longitudinal slots or tracks 75 and 78 is best shown in FIG. 11. It is made of a small piece of flat sheet metal the inner end of which carries a small rectangular piece 83 locked within, and freely slidable in, the track 75, and the outer end of which is bent in the general shape of the letter U and carries a rivet 84 which is slidable in the slot or track 78 and carries an actuating knob 85 at the left of the machine as shown in FIGS. 1, 4, 6, 7, 10 and 11.

The slider 82 with its actuating knob 85 is constantly urged toward the back of the machine (where it lies in FIGS. 1, 4, 6 and 7) by a flat roll spring 86 which is coiled on a spool 87 secured by screw 88 to a tab 89 which is clamped by rivet 79 to the integral extension on the lower rear end of plate 71 (FIGS. 9 and 10), the outer end of said flat roll spring 86 being secured by a small bolt 90 to the slider 82 (FIG. 10). It will thus be evident that whenever the actuating knob 85 of slider 82 is moved forward by hand in FIGS. 1, 4 and 6 (toward the right in FIG. 7), and then released, the roll spring 86 will wind up on its spool 87 and immediately return said slider 82 with its actuating knob 85 to the original "back" position which it occupies in FIGS. 1, 4, 6 and 7.

The purpose of slider 82 is to grasp the free end of the sliver ribbon S which is fed upwardly from the ribbon roll housed in container 63, and then, when the operator grasps the slider actuating knob 85 and moves it forward in FIGS. 1, 4 and 6 (to the right in FIG. 7) to have the slider move said sliver ribbon forward in a straight line until the slider reaches the end of its travel in its longitudinal tracks 75 and 78. At the time this operation is performed, a hinged carriage (hereinafter described) is seated in the path of travel of slider 82 in position to receive the sliver ribbon from the slider. However, before describing said hinged carriage and its function and operation, I shall, for the sake of clarity, complete the description of the slider 82 and associated parts.

When the flat sliver ribbon S emerges from the container 63, it passes upwardly beneath guide roller 69 and then over a guide groove 93 formed in the adjacent tubular spacer 80 in which it is resiliently guided by a leaf spring 94 secured to plate 71 by rivet 79 (FIGS. 6 and 9). From the guide groove 93 the free end of the flat sliver ribbon S is initially threaded by hand through a pair of cooperating leaf springs constituting stationary sliver clamp 95 secured by screws 96 to a small flange integral with plate 71 as shown in FIGS. 4, 6 and 9. When thus initially threaded through clamp 95, the free end of the sliver ribbon S should not project out through the opposite (forward) side of clamp 95. The slider 82 also carries a leaf-spring sliver clamp 97 secured thereto by screws 98 (FIGS. 4 and 6). This sliver clamp 97 is accurately aligned with the stationary sliver clamp 95, and its position on slider 82 is such that, when slider 82 is at the rearward limit of its travel (as it is in FIGS. 4 and 6) said slidable sliver clamp 97 is slightly back of stationary clamp 95 (i.e., it is slightly nearer the back of the machine than is the stationary clamp 95).

Figure 2:
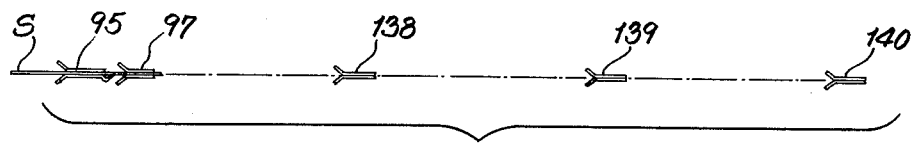
FIG. 2 is a diagrammatic representation of the sliver ribbon holding clamps.

Referring now to the diagram of FIG. 2, it will be noted that the stationary sliver clamp 95 and the slidable sliver clamp 97 are each made of a pair of leaf springs having their rear ends (their left ends in FIG. 2) bent or flared outwardly in the shape of the letter V. Accordingly, when the slidable sliver clamp 97 is moved to the left in FIG. 2 (by allowing the slider 82 to move to its maximum rearward position shown in FIGS. 4 and 6) it will slide completely over the aligned stationary sliver clamp 95 and assume the position best illustrated in FIG. 6. When the slidable clamp 97 reaches said limiting position shown in FIG. 6, its resilient jaws will grasp the sliver ribbon S which was initially threaded by hand between the jaws of stationary clamp 95 as previously explained. Now, when the operator grasps the actuating knob 85 and moves the slider 82 forward in FIGS. 1, 4 and 6, the slider's sliver clamp 97 (with the sliver S clamped between its jaws) will slide completely between the resilient jaws of stationary sliver clamp 95, and it will pull the sliver ribbon S along in its wake. In FIG. 2 the slidable clamp 97 has just emerged from between the jaws of stationary clamp 95, and it will be noted that the end of the sliver ribbon S is clamped between the jaws of said slidable clamp 97.

*Cutting the Sliver Ribbon to Size*

When the slider 82 reaches the forward limit of its travel in its tracks 75 and 78, towing behind it the sliver ribbon S which is clamped in the jaws of the slider's sliver clamp 97, it actuates a cutting mechanism which severs said sliver ribbon to provide a sliver of desired size. At the time this operation is performed, the hinged carriage previously mentioned (but not yet described) has already received the sliver ribbon and is waiting for same to be severed, and also to be released from the slider's sliver clamp 97. Still in the interest of clarity, I shall describe this severing and releasing of the sliver ribbon before describing the carriage unit and its operation.

The mechanism for severing the sliver ribbon comprises a scissors-like slicer having a stationary cutting blade 100 (FIGS. 1, 4, 10 and 11) secured by rivets 101 to a flange 103 on the rear end of supporting plate 71, and a cooperating movable blade 102 which is pivotally mounted on said flange 103 by a stud 104 (FIG. 10). The cutting blades 100 and 102 are in the path of travel of the sliver ribbon S described above, and are perpendicular to said path of travel in a plane which is slightly forward of the stationary sliver clamp 95 (see FIGS. 4 and 6). Consequently whenever the blades 100—102 sever a sliver ribbon, they will sever it at a point immediately forward of the stationary sliver clamp 95, and therefore the severed end which is still joined to the roll of sliver ribbon in container 63 at the back of the machine will remain gripped in the resilient jaws of said stationary sliver clamp 95.

Referring particularly to FIGS. 9–11, the movable blade 102 has an open-ended slot 106 through which projects a double pronged trigger 107. One prong of trigger 107 (the one at the left in FIG. 10) is integral with a depending arm 105 which is pivoted on the supporting plate 71 by a screw 108 (FIG. 9) and extends outwardly through a space between plate 71 and flange 103. The other prong of trigger 107 is integral with another pivoted arm 109 hereinafter described. To the lower end of depending arm 105 there is pivotally connected one end of an elongated stiff wire rod 110 which extends longitudinally behind the supporting plate 71 and has its forward end bent over into a slot 112 in the forward integral extension of said plate 71 as shown in FIG. 9. The bent end of said wire rod 110 extending through said slot 112 reaches into the track 75 near the forward limit of travel of the slider 82 which is actuated by knob 85. Accordingly, when the scissors-like blades 100 and 102 are open (as in FIGS. 1, 4, 10 and 11) and knob 85 is actuated to move slider 82 forward in FIGS. 1 and 4 (to the right in FIG. 7), towing with it the sliver ribbon S as previously described, the small part 83 of slider 82, as it nears the very end of its forward travel in track 75, will cause the wire rod 110 to move longitudinally forward (to the left as viewed in FIG. 9) and, by pulling the depending arm 105 of trigger 107 to the left in FIG. 9, will cause said trigger 107 to move clockwise on its pivot 108 (as viewed in FIG. 9). This means that trigger 107 will move downward as viewed in FIG. 10, causing same to close blade 102 upon blade 100 and sever the sliver ribbon between said blades 100 and 102.

In this way the sliver ribbon S is severed to form a sliver of predetermined length. At the time this happens, as previously mentioned, the sliver is held by the hinged carriage which will presently be described. Since, as will presently appear, the said hinged carriage is about to lift the severed sliver bodily and swing it up to the splicing position, it is necessary to release the forward end of said sliver from the sliver clamp 97 on slider 82. To accomplish this, the forward end of the elongated strip of sheet metal 76 containing track 78 carries a stationary ledge or stripper 114 directly in the path of the sliver clamp 97 (FIGS. 1 and 6) and, when the slider 82 nears its forward limit of travel, the two resilient jaws or leaves of sliver clamp 97 straddle the stripper 114 and are thereby spread enough to allow them to release their grip on the forward end of the sliver.

It remains now to reopen the scissors-like cutting blades 100—102 as the slider 82 with its actuating knob 85 returns to its normal position at the rear of the machine under the action of the flat roll spring 86. To accomplish this, a small stud 116 projects through a larger hole 117 cut in the supporting plate 71 and into the upper edge of the track 75 adjacent the rear end of said track (FIGS. 4, 7 and 9) so that the flat portion 83 of slider 82 (which slides in track 75) will ride under and exert a lifting force on said stud 116 when the slider returns to its normal position at the rear of the machine. The said stud 116 is secured to the previously mentioned arm 109 which is integral with one of the prongs of trigger 107. This arm 109 is pivotally mounted on a rivet 119 on the rear face of plate 71 (FIG. 9) and it has a slot through which passes the pivot screw 108 of arm 105. Consequently, when the slider 82, in returning to its normal position at the rear of the machine, rides under and raises the stud 116 carried by arm 109, the said arm 109 will move upwardly on its pivot 119. In thus moving upwardly on its pivot 119, the arm 109 causes the depending arm 105 of trigger 107 to move on its pivot 108 (in a counter-clockwise direction as viewed in FIG. 9) thus elevating trigger 107 in the slot 106 of movable cutting blade 102 and elevating said blade to the open position shown in FIGS. 10 and 11. The parts described keep the blade 102 in elevated position, preventing accidental closing, until the next positive cutting operation described above. The pivoting or canting movement of arm 105, of course, also pulls the wire rod 110 back to the position shown in FIG. 9.

When the movable cutting blade again descends to sever another length of sliver ribbon, in the manner previously described, the pivoting of arm 105 (by wire rod 110) in a clockwise direction as viewed in FIG. 9, will lower the arm 109 about its pivot 119, thus lowering the stud 116 enough to make it project into the track 75 ready to be tripped by the flat portion 83 of slider 82 when said slider again returns to the rear of the machine under the action of the flat roll spring 86.

*Hinged Carriage for Positioning the Sliver*

It has already been explained how the sliver clamp 97 (carried by slider 82 which is actuated by knob 85) grasps the end of the sliver ribbon from the stationary sliver clamp 95; and how, when the knob 85 moves forward, the sliver clamp 95; and how, when the knob 85 moves forward, the sliver clamp 97 moves forward and tows the sliver ribbon along with it in a straight line.

The purpose of the hinged carriage, now to be described, is to receive the sliver ribbon as it is being towed along in a straight line by the moving sliver clamp 97, and then, as soon as the sliver ribbon has been severed as previously described, to swing the severed sliver upwardly to the splicing position.

The hinged sliver carriage 123 (FIGS. 6, 7 and 12) comprises a flat strip of metal which is hinged at 124 to the narrow flat top of supporting plate 71 and is adapted, when moved down on its hinges 124 against the tension of coil spring 125 (FIGS. 6 and 9) to lie flat against the top of said plate 71 as shown in FIG. 6. The carriage has a flat integral side flange 126 which is adapted to lie adjacent and parallel to the depending (vertical) flat side of plate 71, as shown in FIG. 7, when the carriage is moved to said "down" position against the tension of said spring 125.

When the hinged carriage is in the "down" position shown in FIGS. 6 and 7, it is retained in such position by a claw-shaped latch 127 which is pivoted at 128 to supporting plate 71 (FIGS. 6, 7 and 9). A coil spring 130 (FIG. 9), having one end secured to an integral detent 131 on latch 127, and the other end secured to plate 71, urges the claw of latch 127 into the locking position. Whenever the raised carriage 123 is lowered to the aforementioned "down" position, the descending edge of said carriage rides over the sloping top of latch 127, and, as soon as the carriage lies flat against the flat top of plate 71, the latch 127 automatically locks the carriage in this "down" position.

In order to unlock the latch 127 automatically we provide a bent stiff wire rod 132 (FIGS. 7 and 9) one hooked end of which extends through a hole in the latch's detent 131 and the other end of which extends through the slot 112 (FIG. 9) in the forward integral extension of plate 71, which slot 112 also contains the forward end of the previously described wire rod 110 which actuates the scissors-like sliver slicer. Accordingly, when the slider 82, actuated by knob 85, nears the forward end of its travel in tracks 75 and 78, the small slider part 83 travelling in track 75 not only moves the wire rod 110 to the left in FIG. 9 to sever the sliver ribbon, but also moves the wire rod 132 in the same direction to release the latch 127 from its grip on carriage 123. When this happens, the entire sliver carriage moves on its hinges 124 to the raised position shown in FIG. 12, due to the action of coil spring 125.

The hinged sliver carriage 123 also includes a narrow arm 133 which is pivoted to the carriage's side flange 126 at 135, as shown in FIGS. 6, 7 and 12. When the carriage 123 is in the "down" position shown in FIGS. 6 and 7, said pivoted arm 133 extends straight out and thus forms a linear extension of the lower edge of the carriage's flange 126. When the operator wishes to lower the entire carriage from the raised position shown in FIG. 12, he simply moves the carriage forward quickly on its hinges 124 (against the tension of coil spring 125) while simultaneously flipping the carriage's pivoted arm 133 upon its pivot 135 to the straight-out position. As the carriage starts its descent in this manner, the pivoted arm 133 halts in the straight-out position because its edge adjacent pivot 135 hits a small ledge (not shown) on the carriage's flange 126 which halts the straightening-out movement of arm 133.

As the quickly descending straightened-out carriage approaches the "down" position shown in FIGS. 6 and 7, the outer free end of its pivoted arm 133 (top of FIG. 6) hits and rides up on the smooth conical end of a stop pin 137 (see also, FIGS. 1 and 4) and its pivot 135 and a small cam 134 (hereinafter described) seat in holes 136 in the plate 71 (FIG. 9). Thus, the carriage comes to rest in the "down" position shown in FIGS. 6 and 7 where it is held by the claw-shaped latch 127. In this "down" position, the side flange 126 of the carriage and its pivoted arm 133 are disposed in elongated linear file longitudinally of the tracks 75 and 78, ready to pick up the sliver ribbon S which is about to be moved forward in FIG. 6 as soon as the operator actuates the knob 85.

For the purpose of picking up the sliver ribbon S from the slidable sliver clamp 97 (which moves forward with knob 85) the hinged carriage 123 is provided with three sliver clamps 138, 139 and 140 (FIGS. 2, 6 and 12). Sliver clamp 138 is secured to the free end of pivoted arm 133 by rivets 141, while sliver clamps 139 and 140 are secured adjacent opposite ends of the carriage's flange 126 by rivets 142 and 143 (FIGS. 6 and 12). These sliver clamps 138, 139 and 140 are so mounted that they are in linear alignment with each other, and with the stationary sliver clamp 95 and the slidable sliver clamp 97 (see FIG. 2) when the hinged carriage 123 is in the "down" position shown in FIGS. 6 and 7. The sliver clamps 138, 139 and 140 (like the clamps 95 and 97) are each made of a pair of leaf springs having their rear ends (their left ends in FIG. 2) bent outwardly in the shape of the letter V. Consequently, after the slidable sliver clamp 97, moving forward from the initial position shown in FIG. 6, has passed through the jaws of stationary sliver clamp 95 and thus grasped the end of the sliver ribbon S (which is the precise condition pictured in FIG. 2) the continuing linear travel of said sliver clamp 97 (forward in FIG. 6; to the right in FIG. 2) will cause said clamp 97 to slide rapidly between the resilient jaws of clamps 138, 139 and 140 in the order mentioned, towing the sliver ribbon S behind it. Thus, as soon as the slidable clamp 97 passes through the final clamp 140 at the right of FIG. 2 (forward in FIG. 6) the sliver ribbon S will be clamped resiliently in the jaws of all three of the clamps 138, 139 and 140 on the hinged carriage 123. Of course, at the prcise instant slidable clamp 97 passes through said final carriage clamp 140, the sliver ribbon S will still be clamped in the jaws of stationary clamp 95 at the left of FIG. 2 and the jaws of slidable clamp 97 which will have reached the right of FIG. 2.

As previously explained, as the actuating knob 85 (with slider 82 and clamp 97) approaches the very end of its forward travel in FIG. 6 (to the right in FIG. 7) the resilient jaws of slidable clamp 97 are spread apart by stripper 114 (FIGS. 1, 6 and 7) enough to loosen their grip on the end of the sliver ribbon; and the wire rod 110 is moved (to the left in FIG. 9) to actuate the movable slicer blade 102 (FIGS. 1, 4, 6, 10 and 11) to sever the sliver ribbon at a point just forward of the stationary sliver clamp 95 (FIG. 6) so that the end of the ribbon still joined to the roll in container 63 remains gripped in the jaws of said stationary clamp 95. Accordingly, the severed sliver is now held only by the sliver clamps 138, 139 and 140 of hinged carriage 123.

It will be recalled that the very same action which moves the wire rod 110 to the left in FIG. 9 to actuate movable slicer blade 102, likewise moves wire rod 132 to the left in FIG. 9 to actuate the claw-shaped latch 127 which thereupon releases its grip on hinged carriage 123. The carriage's coil spring 125 now immediately swings the entire carriage 123 (which holds sliver S) upwardly on its hinges 124 to the position shown in FIG. 12. Due to the weight and balance of the pivoted arm 133 of carriage 123, centrifugal force always folds said arm 133 over on its pivot 135 to the semi-upright position shown in FIG. 12, on the upward swing of the carriage. In this semi-upright or partially folded position of the pivoted arm 133, a ledge 145 on said arm 133 (FIGS. 1, 7 and 12) strikes against a cam lug 146 which is an integral part of a lever 147 pivoted at 148 (FIGS. 7 and 12) to the side flange 126 of carriage 123, which lever 147 may be depressed against the action of a coil spring 149 one end of which is secured to flange 126 and the other end of which is secured to lever 147 adjacent its pivot 148.

When hinged carriage 123 is in the precise elevated position shown in FIG. 12 its flat top rests on the top of base 1 of the machine, and its sliver clamps 139 and 140 straddle the heater block 20, the clamp 139 lying adjacent the rear end of the heater block 20 in FIG. 1 and the clamp 140 lying adjacent the forward end of said heater block. When the parts are in this position with the sliver clamps 139 and 140 of carriage 123 straddling the heater block 20, the portion of the sliver S which is secured between said clamps 139 and 140 lies directly on said heater block; furthermore, it reaches linearly athwart said heater block from the rear end to the forward end thereof in the precise position where the splice between the films A and B is to be effected. Consequently, with the carriage 123 still in the position just described (FIG. 12), if the locked film clamps 7—8 and 9—10, carrying the respective films B and A, are swung to their "back" positions as in FIG. 4 (where they rest on their respective back stops 18 as previously described) the previously-trimmed edges of said films will rest in abutting relation upon the aforementioned sliver portion directly overlying the heater block 20.

In practice, the locked clamp members 7—8, carrying the trimmed film B, are swung to the "back" position before the locked clamp member 9—10 are so moved. Hence the trimmed end of film B is the first to be seated on the aforementioned sliver portion directly overlying the heater block 20 (and still held by sliver clamps 139 and 140). The operator then swings the locked clamp members 9—10, carrying the trimmed film, to said back position. In this way the trimmed end of film A is seated on the said sliver portion still held by sliver clamps 139 and 140, in end-to-end contact with said film B directly overlying the heater block 20. Furthermore, as the locked clamp members 9—10 descend, clamp 10 strikes cam 134 on arm 133 of carriage 123 and moves said arm 133 downwardly upon its pivot 135, from the position shown in FIG. 12 to the position shown in FIG. 13. The pivoted arm 133 descends in this manner after the film A, hence the trimmed end of film A is seated on the sliver portion still held by sliver clamps 139 and 140 (as just described) before the other half of the sliver which is still gripped at its end by sliver clamp 138. The two abutting ends of films A and B are now sandwiched between the two halves of the folded sliver. Leaf spring 150 on arm 133 prevents the film from bowing upwardly, assuring that it maintains its alignment in the film-sliver sandwich.

With the parts in this position, the operator grasps the pressure arm 22 and lowers it upon its pivot 23. When the pressure arm reaches the lower limit of its travel, where it is held closed by engagement with the latch 25 previously described, the pressure block 27 overlies the juncture of the films A and B; that is, the assembly consisting of the ends of films A and B, sandwiched between the two halves of folded sliver S, is now held between heater block 20 and pressure block 27. The operator now actuates pressure lever 30, and at the same time puts the machine through the heating cycle, so that during the heat-splicing interval the sliver-film sandwich is held under considerable pressure. After the splicing operation is completed, the pressure lever 30 is released and after a brief cooling period the pressure arm 22 is raised to the position shown in FIGS. 1 and 7.

It is now necessary to remove the bonded sliver from the sliver clamps of the carriage 123. In order to remove said sliver from the middle clamp 139 we provide a stripper 153 which is pivoted at 154 to a small ledge 155 projecting from the underside of the flat top of supporting plate 71, as shown in FIGS. 6 and 7. This stripper has a coil spring 156 which normally holds it in the position shown in FIGS. 6 and 7 where a stop 157 on the stripper engages ledge 155, and it has an upstanding finger 158 which lies just to the right (in FIG. 7) of the position which the sliver clamp 139 occupies when the carriage is in its raised position. When the sliver is held by the clamps 138, 139 and 140, as previously described, the stripper finger 158 lies just to the left of said sliver (as viewed in FIG. 6). When pressure arm 22 is in the "down" position shown in FIG. 4, a small latch 159 pivoted at 160 on said arm 22 and actuated by spring 161 (FIGS. 1, 4 and 7) engages beneath the side edge of stripper 153. When the operator raises the pressure arm 22 upon its pivot 23, the stripper 153 is moved upon its pivot 154 and the downwardly canting finger 158 will push the sliver out of the middle clamp 139. As the operator turns hand wheel 5 toward the front, lifter lever 147 pivoted on pin 148 springs upward due to exerted force of spring 149 releasing one end of the sliver from clamp 138. The forward rotation of hand wheel 5, which rotates the locked film clamps 7—8 and 9—10 simultaneously forward until they rest on their forward stop members 12, releases the sliver from clamp 140. The operator then raises the top clamp members 7 and 9, and removes the spliced film unit from the machine. It appears as shown in FIG. 5; and, after slicing off the surplus projecting ends of the sliver as shown in FIG. 8, the finished product appears as in FIG. 2.

*Operation*

The operator closes the main switch 35 (FIG. 13) lighting lamps 36 and 38, and conditioning the electrical circuit to be closed when the start switch 45 is later closed.

With the parts of the machine in the general position shown in FIG. 7, the operator, who is in front of the machine, grasps the slider-actuating knob 85 with his left hand and moves it all the way forward in FIG. 4. Thereby the sliver ribbon S is pulled through the sliver clamps 138, 139 and 140 (FIG. 2) on hinged carriage 123; the stripper 114 (FIG. 6) spreads the resilient jaws of the slidable sliver clamp 97 at the end of its travel, causing said clamp 97 to release its grip on the forward end of sliver ribbon S; the scissors-like cutting blades 100 and 102 (FIGS. 1 and 4) sever the sliver ribbon at a point immediately to the right of stationary clamp 95 in FIG. 2, while the end of the ribbon still joined to the ribbon roll in container 63 remains gripped in the jaws of stationary clamp 95; and the claw-shaped latch 127 (FIGS. 7 and 9) is actuated to release its grip on the hinged carriage 123 which immediately swings upwardly on its hinges 124 to the position shown in FIG. 12. The centrifugal force of this upward swing always makes the pivoted arm 133 of carriage 123 fold to the semi-upright position shown in FIG. 12.

With the hinged carriage 123 in the elevated position shown in FIG. 12, the portion of sliver S held by sliver clamps 139 and 140 rests on heater block 20 as previously described. The films A and B, to be spliced, have their edges trimmed separately as previously described. The locked film clamps containing said films A and B are swung back to the splicing position as previously described, but the operator leaves the cutter arm 6 in the "down" position which it occupies in FIG. 4. As previously described, the two folded halves of said sliver S now lie like a clothespin or hairpin with the abutting edge portions of films A and B sandwiched between them, resting on heater block 20. The operator now lowers the pressure arm 22 upon its pivot 23 until it is locked in its forward position by the spring-actuated latch 26 on base 1. Thereupon the operator depresses the pressure lever 30 and at the same time puts the machine through the heating cycle previously described.

At the conclusion of the heating cycle, and subsequent brief cooling period, the operator, having already released the pressure lever 30, now actuates the pressure arm release knob 52, allowing the spring-actuated pressure arm 22 to swing up to the position shown in FIGS. 1 and 7. This flips the stripper 153 to release the sliver S from the middle sliver clamp 139. The operator actuates hand wheel 5 to pivot the locked film clamps 7—8 and 9—10 (containing the spliced film) to the forward position shown in FIG. 7, and the sliver S is automatically slipped out of the sliver clamps 138 and 140. The clamp members 7 and 9 are then unlocked from their respective mating member 8 and 10, and the spliced film is lifted out of the machine.

The spliced film, as it emerges from the machine, is shown in FIG. 5. In FIG. 8 the looped end of the sliver S has been trimmed off by an arcuate knife blade 56 at the front of the machine; actually, the looped end and the tail ends of said sliver are preferably trimmed off simultaneously by the two accurately positioned knife blades 56 shown in FIG. 7, although they may be trimmed separately if desired. The finished product is as shown in FIG. 2. The operator may now inspect the splice at the illuminated window 37 in the front of base 1.

The length of the sliver S which is severed from the continuous sliver ribbon may, of course, be varied as desired, either by changing the position of the cutting blades 100—102 when the parts are assembled, by changing the length of travel of the slider 82 actuated by knob 85, or by using a hinged carriage 123 and associated parts of different dimensions. Similarly, a sliver may be heat-sealed on only one side of the films to effect the splice.

While a specific machine is shown and described herein for purposes of illustration, it will be evident to those skilled in the art that the invention is capable of various modifications and adaptations within the scope of the appended claims.

The invention claimed is:

1. Apparatus for splicing two strips of material comprising, in combination, a heater block and a cooperating movable pressure block, means for feeding a partially folded sliver to said heater block so that the portion of said sliver on one side of the fold rests on said heater block and the portion of said sliver on the other side of the fold is semi-upright, means for arranging said strips of material end-to-end on the portion of said sliver which is on said heater block, means for folding the semi-upright portion of said sliver upon the adjacent end portions of said strips of material, and means for heating said heater block and simultaneously compressing said pressure block and said heater block.

2. Apparatus for thermoplastically splicing two strips of material comprising, in combination, a heater block and a cooperating movable pressure block, a dispenser containing a continuous ribbon, means for drawing said ribbon from said dispenser, means for severing said ribbon to separate a sliver therefrom, means for partly folding said sliver and moving it to said heater block so that the portion of said sliver on one side of the fold rests on said heater block and the portion of said sliver on the other side of the fold is semi-upright, means for mounting said strips of material end-to-end on the portion of said sliver which is on said heater block, means for further folding the semi-upright portion of said sliver upon the adjacent end portions of said strips of material, and means for heating said heater block and simultaneously forcing said pressure block and said heater block together under pressure.

3. Apparatus for thermoplastically splicing two films comprising, in combination, a heater block and a cooperating movable pressure block, a dispenser containing a continuous thermoplastic ribbon, means for drawing said ribbon from said dispenser in a linear direction, means for severing said ribbon to separate a linear thermoplastic sliver therefrom, means for partly folding said sliver in about the middle and moving it to said heater block so that the half of said sliver on one side of the fold rests on said heater block and the half of said sliver on the other side of the fold is semi-upright above said heater block, means for mounting said films end-to-end on the half of said sliver which is on said heater block, means for folding the semi-upright half of said sliver upon the adjacent end portions of said films, and means for heating said heater block and simultaneously forcing said pressure block and said heater block together under pressure.

4. Apparatus for thermoplastically splicing two strips of thermoplastic film comprising, in combination, a base having a heater block and a cooperating movable pressure block, means including a slider for feeding a thermoplastic ribbon longitudinally of said base, means including a movable carriage for receiving said ribbon from said slider, means actuated by said slider for severing said ribbon to leave a sliver of ribbon held by said carriage, means on said carriage for folding said sliver to substantially V-shape, means actuated by said slider for moving said carriage to rest one half of said sliver on said heater block and the other half of said sliver overlying said heater block, means for placing the two strips of film to be spliced end-to-end and on the half of said sliver on said heater block, and means for folding the other half of said sliver down upon the adjacent end portions of said films.

5. Apparatus for thermoplastically splicing two strips of thermoplastic film comprising, in combination, a base having a heater block and a cooperating movable pressure block, a pair of spaced elongated stationary tracks mounted in longitudinal alignment on said base, a slider longitudinally movable in said tracks, means on said slider for pulling a thermoplastic ribbon longitudinally between said tracks, a carriage hinged on said base and having a flange positioned to lie adjacent said heater block when said carriage is raised on its hinges and to reach into the space between said tracks when said carriage is lowered on its hinges, an arm pivoted on said carriage in position to extend linearly outward of the lower edge of said carriage flange when the latter is lowered between said tracks, said pivoted arm being adapted to swing by centrifugal force to a folded semi-upright position on said carriage when the latter is swung upwardly on its hinges, means on said carriage and the pivoted arm of said carriage for grasping and holding said ribbon towed forward by said slider, means actuated by said slider adjacent the forward end of said tracks for severing said ribbon at a point adjacent the rear end of said tracks, means actuated by said slider adjacent the forward end of said tracks for releasing said ribbon from said slider, means actuated by said slider adjacent the forward end of said tracks to swing said hinged carriage upwardly to its raised position carrying the forward portion of the thermoplastic sliver severed from said ribbon onto said heater block and the rest of said ribbon partly folded over in the semi-upright pivoted arm of said carriage, means for placing the two strips of film to be spliced end-to-end on the portion of said sliver on said heater block, and means for folding the semi-upright pivoted arm of said carriage downwardly to fold the rest of said sliver down upon the adjacent end portions of said films.

6. Apparatus for thermoplastically splicing two strips of thermoplastic film comprising, in combination, a base having a top and a side wall, a heater block and a cooperating movable pressure block on the top of said base, a pair of spaced elongated stationary tracks mounted in longitudinal alignment on said side wall, a slider longitudinally movable in said tracks, means on said slider for pulling a thermoplastic ribbon longitudinally between said tracks, a carriage hinged on the top of said base and having a right-angled flange positioned to lie adjacent said heater block when said carriage is raised on its hinges and to reach into the space between said tracks when said carriage is lowered on its hinges, means for swinging said hinged carriage upwardly to its raised position, means for holding said carriage in its lowered position, an arm pivoted on said carriage in position to extend linearly outward of the lower edge of said carriage flange when the latter is lowered between said tracks, said pivoted arm being adapted to swing by centrifugal force to a folded semi-upright position on said carriage when the latter is swung upwardly on its hinges, means on said carriage and the pivoted arm of said carriage for grasping and holding said ribbon towed forward by said slider, means actuated by said slider adjacent the forward end of said tracks for severing said ribbon at a point adjacent the rear end of said tracks, means actuated by said slider adjacent the forward end of said tracks for releasing said ribbon from said slider, means actuated by said slider adjacent the forward end of said tracks to release said hinged carriage and permit same to swing upwardly to its raised position carrying the forward portion of the thermoplastic sliver severed from said ribbon onto said heater block and the rest of said ribbon partly folded over in the semi-upright pivoted arm of said carriage, means for placing the two strips of film to be spliced end-to-end on the portion of said sliver on said heater block, and means for folding the semi-upright pivoted arm of said carriage downwardly to fold the rest of said sliver down upon the adjacent end portions of said films.

7. Apparatus for thermoplastically splicing two strips of thermoplastic film comprising, in combination, a base having a top and a side wall, a heater block and a cooperating movable pressure block on the top of said base, a pair of spaced elongated stationary tracks mounted in longitudinal alignment on said side wall, a slider movable longitudinally in said tracks, means for storing a roll of thermoplastic ribbon adjacent the rear end of said tracks, means for guiding the end of said ribbon into the space between said tracks adjacent the rear end thereof, clamping means carried by said slider for gripping and holding the end of said ribbon, a carriage hinged on the top of said base and having a right-angled flange positioned to lie adjacent said heater block when said carriage is raised on its hinges and to reach into the space between said tracks when said carriage is lowered on its hinges, means for swinging said hinged carriage upwardly to its raised position, a pivoted latch engageable with said carriage to hold the latter in its lowered position, an arm pivoted on said carriage in position to extend linearly outward of the lower edge of said carriage flange when the latter is lowered between said tracks, said pivoted arm being adapted to swing by centrifugal force to a folded semi-upright position on said carriage when the latter is swung upwardly on its hinges, means on said carriage and the pivoted arm of said carriage for grasping and holding said ribbon towed forward by said slider, means actuated by said slider adjacent the forward end of said tracks for severing said ribbon at a point adjacent the rear end of said tracks, means actuated by said slider adjacent the forward end of said tracks for releasing said ribbon from the clamping means carried by said slider, means actuated by said slider adjacent the forward end of said tracks to actuate said pivoted latch to permit said hinged carriage to swing upwardly to its raised position carrying the forward portion of the thermoplastic sliver severed from said ribbon onto said heater block and the rest of said ribbon partly folded over in the semi-upright pivoted arm of said carriage, means for mounting the two strips of film to be spliced end-to-end on the portion of said sliver on said heater block, and means for folding the semi-upright pivoted arm of said carriage downwardly to fold the rest of said sliver down upon the adjacent end portions of said films.

8. Apparatus for thermoplastically splicing two strips of thermoplastic film comprising, in combination, a base having a top and a side wall, a heater block and a cooperating movable pressure block on the top of said base, a pair of spaced elongated stationary tracks mounted in longitudinal alignment on said side wall, a slider movable longitudinally in said tracks, means for storing a roll of flat thermoplastic ribbon adjacent the rear end of said tracks, means for guiding the end of said ribbon into the space between said tracks adjacent the rear end thereof, a stationary ribbon clamp including a pair of cooperating resilient jaws mounted between said tracks adjacent the rear end thereof, the jaws of said ribbon clamp having outwardly flared rear ends and forward ends shaped to resiliently grip said ribbon, a similar but movable ribbon clamp carried by said slider and positioned to be moved thereby longitudinally between said tracks in the plane occupied by said stationary ribbon clamp, said movable ribbon clamp being slidable over the jaws of said stationary ribbon clamp when moved rearwardly thereof and being slidable between the jaws of said stationary ribbon clamp to grip said ribbon from the latter when moved forwardly, a sliver carriage hinged on the top of said base and having a right-angled flange positioned to lie adjacent said heater block when said carriage is raised on its hinges and to reach into the space between said tracks when said carriage is lowered on its hinges, means for swinging said hinged carriage upwardly to its raised position, a pivoted latch engageable with said carriage to hold the latter in its lowered position, an arm pivoted on said carriage in position to extend linearly outward of the lower edge of said carriage flange when the latter is lowered between said tracks, said pivoted arm being adapted to swing by centrifugal force to a folded semi-upright position on said carriage when the latter is swung upwardly on its hinges, sliver clamps mounted on said carriage and the pivoted arm of said carriage in position to lie directly in the longitudinal path of travel of said movable ribbon clamp and having jaws with outwardly flared rear ends to permit the passage therebetween of said movable ribbon clamp and forward ends shaped to resiliently grip the ribbon towed by said movable ribbon clamps, means actuated by said slider adjacent the forward end of said tracks for severing said ribbon at a point immediately forward of said stationary ribbon clamp, means actuated by said slider adjacent the forward end of said tracks for opening the jaws of said movable ribbon clamp to release said ribbon therefrom, means actuated by said slider adjacent the forward end of said tracks to actuate said pivoted latch to permit said hinged carriage to swing upwardly to its raised position carrying the forward portion of the thermoplastic sliver severed from said ribbon onto said heater block and the rest of said ribbon partly folded over in the semi-upright pivoted arm of said carriage, means for mounting the two strips of film to be spliced end-to-end on the portion of said sliver on said heater block, and means for folding the semi-upright pivoted arm of said carriage downwardly to fold the rest of said sliver down upon the adjacent end portions of said films.

9. Apparatus for thermoplastically splicing two strips of thermoplastic film comprising, in combination, a base having a top and a side wall, a heater block and a cooperating movable pressure block on the top of said base, a pair of spaced elongated stationary tracks mounted in longitudinal alignment on said side wall, a slider movable longitudinally in said tracks, means for storing a roll of flat thermoplastic ribbon adjacent the rear end of said tracks, means for guiding the end of said ribbon into the space between said tracks adjacent the rear end thereof, a stationary ribbon clamp including a pair of cooperating resilient jaws mounted between said tracks adjacent the rear end thereof, the jaws of said ribbon clamp having outwardly flared rear ends and forward ends shaped to resiliently grip said ribbon, a similar but movable ribbon clamp carried by said slider and positioned to be moved thereby longitudinally between said tracks in the plane occupied by said stationary ribbon clamp, said movable ribbon clamp being slidable over the jaws of said stationary ribbon clamp when moved rearwardly thereof and being slidable between the jaws of said stationary ribbon clamp to grip said ribbon from the latter when moved forwardly, a sliver carriage hinged on the top of said base and having a right-angled flange positioned to lie adjacent said heater block when said carriage is raised on its hinges and to reach into the space between said tracks when said carriage is lowered on its hinges, a spring acting on said hinged carriage to swing the latter to its raised position, a pivoted latch engageable with said carriage to hold the latter in its lowered position, an arm pivoted on said carriage in position to extend linearly outward of the lower edge of said carriage flange when the latter is lowered between said tracks, said pivoted arm being adapted to swing by centrifugal force to a folded semi-upright position on said carriage when the latter is swung upwardly on its hinges, sliver clamps mounted on said carriage and the pivoted arm of said carriage in position to lie directly in the longitudinal path of travel of said movable ribbon clamp and having jaws with outwardly flared rear ends to permit the passage therebetween of said movable ribbon clamp and forward ends shaped to resiliently grip the ribbon towed by said movable ribbon clamps, means actuated by said slider adjacent the forward end of said tracks for severing said ribbon at a point immediately forward of said stationary ribbon clamp, means actuated by said slider adjacent the forward end of said tracks for opening the jaws of said movable ribbon clamp to release said ribbon therefrom, means actuated by said slider adjacent the forward end of said tracks to actuate said pivoted latch to permit said hinged carriage to swing upwardly to its raised position carrying the forward portion of the thermoplastic sliver severed from said ribbon onto said heater block and the rest of said ribbon partly folded over in the semi-upright pivoted arm of said carriage, means for mounting the two strips of film to be spliced end-to-end on the portion of said sliver on said heater block, means for folding the semi-upright pivoted arm of said carriage downwardly to fold the rest of said sliver down upon the adjacent end portions of said films, and means for heating said heater block and simultaneously depressing said pressure block to bond said films and said sliver together.

References Cited in the file of this patent
UNITED STATES PATENTS

| 1,931,953 | Cameron | Oct. 24, 1933 |
| 2,101,458 | Sachtleben | Dec. 7, 1937 |
| 2,468,629 | Herzig et al. | Apr. 26, 1949 |
| 2,499,686 | Selmin | Mar. 7, 1950 |
| 2,577,570 | Eisenberg | Dec. 4, 1951 |
| 2,672,251 | Schwartz et al. | Mar. 16, 1954 |
| 2,795,263 | Honkanen | June 11, 1957 |
| 2,969,106 | Reibel et al. | Jan. 24, 1961 |
| 3,011,936 | Baumbach et al. | Dec. 5, 1961 |